United States Patent [19]

Ramsey

[11] Patent Number: 5,009,285
[45] Date of Patent: Apr. 23, 1991

[54] COMBINATION BACKPACK AND TREE STAND

[76] Inventor: E. Don Ramsey, Rte. 1, Box 247, Konawa, Okla. 74849

[21] Appl. No.: 525,824

[22] Filed: May 21, 1990

[51] Int. Cl.$^5$ ............................................. A01M 31/02
[52] U.S. Cl. ...................................... 182/187; 108/152
[58] Field of Search ............... 187/187, 188, 134, 135; 108/152

[56] References Cited

U.S. PATENT DOCUMENTS

| | | | |
|---|---|---|---|
| 4,411,335 | 10/1983 | Forrester | 182/187 X |
| 4,475,627 | 10/1984 | Eastridge | 182/187 |
| 4,582,165 | 4/1986 | Catini | 182/187 |
| 4,582,165 | 4/1986 | Latini | 182/20 |
| 4,600,081 | 7/1986 | Wade | 108/152 X |
| 4,667,773 | 5/1987 | Davis | 182/187 |

FOREIGN PATENT DOCUMENTS 802897 7/1949 Fed. Rep. of Germany ...... 182/188

Primary Examiner—Alvin C. Chin-Shue
Attorney, Agent, or Firm—Robert K. Rhea

[57] ABSTRACT

A hunter's tree stand and backpack frame is formed by a seat frame having a seat and having cam members at the end of the seat disposed adjacent a tree or upright. The seat frame having a chain stop adjacent each side of the seat for supporting the seat at a selected elevation by the cams binding the tree between the cams and a first chain surrounding the tree.

Downwardly projecting legs secured to the seat are provided with tree engaging prongs for maintaining the seat in a preferably horizontal position, normal to the tree axis. A turnbuckle secured with the seat frame engages a second chain extended around the tree below the cams and first chain to secure the depending portion of the frame to the tree.

3 Claims, 1 Drawing Sheet

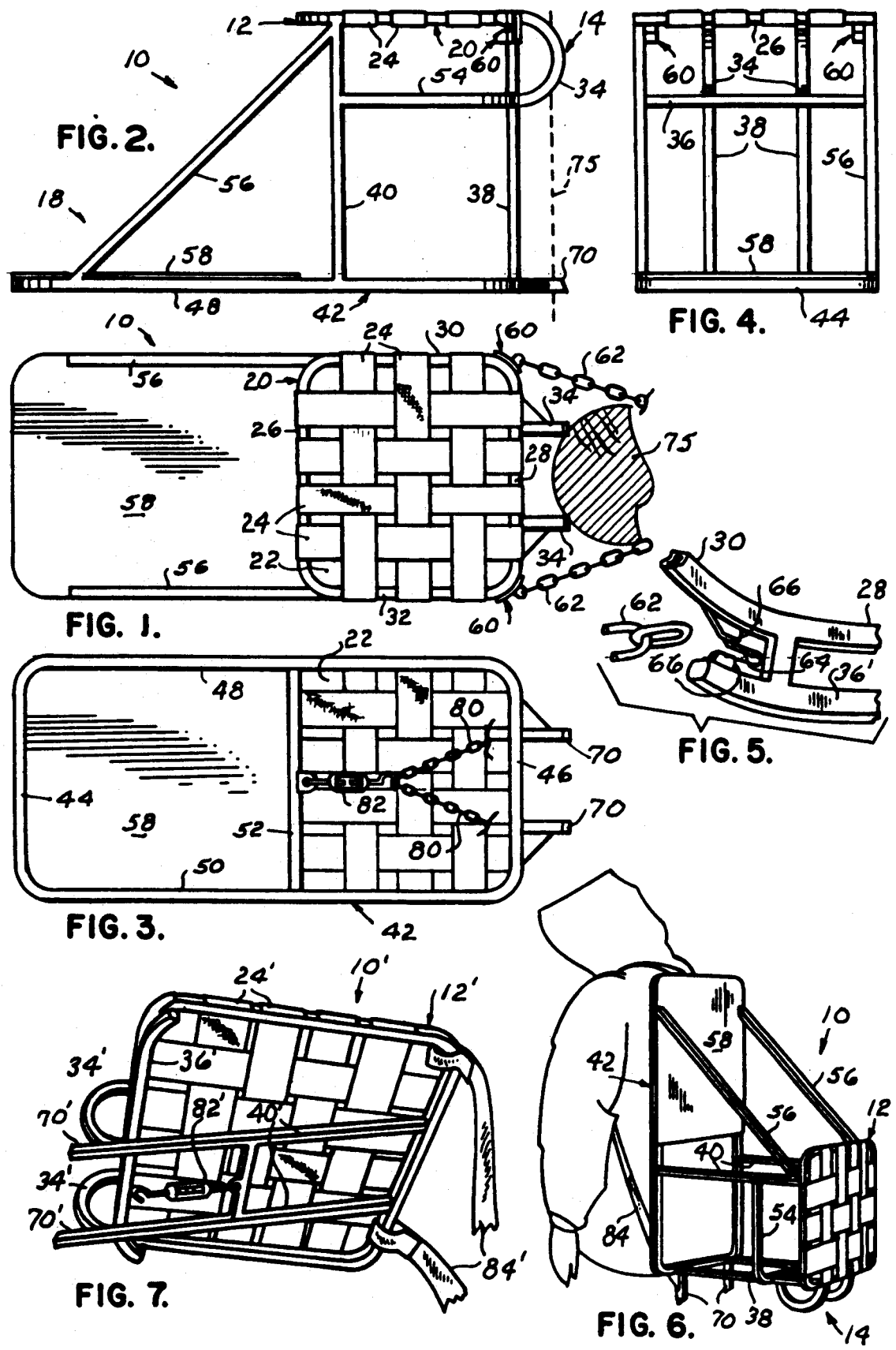

COMBINATION BACKPACK AND TREE STAND

BACKGROUND OF THE INVENTION

1. Field of the invention

The present invention relates to big game hunting and more particularly to a combination backpack and tree stand.

In the past, tree stands as commonly used in hunting, have been generally constructed on a tree and secured to the tree in a permanent fashion. These early stands were constructed mostly of wood and were functional and inexpensive to build. However, the construction of such tree stands was a time consuming project and since they were generally permanently attached to the tree, such tree stands were not easily moved and consequently did not lend themselves for use in hunting in other areas.

The development of portable tree stands has resulted a considerable increase in the use of tree stands by hunters for the reasons they are marketed as a pre-assembled unit that may be temporarily secured to a tree and moved to other locations.

This invention provides such a portable tree stand which may be used as a backpack for carrying hunter's equipment and/or supplies when relocating.

2. Description of the prior art.

U.S. Pat. No. 4,475,627 discloses a combination camp stool and tree stand which collapses or is folded for carrying on the back of the hunter when going to and from the hunting area. The stand seat portion being attached to the tree by a flexible member encircling the tree and attached at its respective ends to the seat. When the seat portion is unfolded it acts as a fulcrum against the tree in which a couple of cleats are forced into the bark of the tree to secure the stand in place and prevents downward movement of the stand relative to the tree.

U.S. Pat. No. 4,582,165 also discloses a combination tree stand and backpack in which the seat portion of the stand is placed adjacent the trunk of a tree and a flexible member entrained around the tree and connected at its respective ends to the seat frame below the plane of the normally horizontal position of the seat. The seat being inclined upwardly when the flexible strand is attached thereto so that the mass of the seat structure and the hunter thereon provides a fulcrum action of the seat edge adjacent the tree to securely fasten the seat structure to the tree against the downward movement of the seat structure relative to the tree.

This invention similarly uses a fulcrum action of seat support members binding against the tree when attached thereto by a flexible member and the seat is moved downwardly to a horizontal position. Prongs below the level of the seat engage the trunk of the tree to prevent lateral movement of the seat around the tree.

SUMMARY OF THE INVENTION

A rectangular rigid seat frame having a seat is provided with a pair of laterally spaced-apart, semicircular cams extending downward in parallel relation beyond the rearward end of the seat.

A chain connected with respective rearward side limits of the seat and extended around a tree trunk while the forward end portion of the seat is inclined upwardly generates a cam action against the tree when the forward end portion of the seat frame is lowered, thus securing the seat frame to the support.

A pair of tree engaging prongs connected with the seat frame project rearwardly in downward spaced relation with respective to the seat.

In one embodiment, the seat frame includes depending legs connecting a horizontal foot platform or stand to the seat frame in forwardly projecting relation with respect to the seat, opposite the position of a tree.

In another embodiment, the stand or platform is omitted in the interest economy and portability of the device.

The principal object is to provide a rigid, light weight, relatively inexpensive tree stand and backpack frame which may be easily and quickly connected with a tree at any selected elevation and is easily removed therefrom which will not move either laterally or downwardly relative to the tree while occupied by a hunter.

BRIEF DESCRIPTION OF THE DRAWINGS

FIG. 1 is a top view of one embodiment of the device attached to a tree, only a fragment of the latter being shown;

FIG. 2 is a side elevation view;

FIG. 3 is a bottom view of the device;

FIG. 4 is a front end elevational view;

FIG. 5 is a fragmentary perspective view, to a larger scale, of the chain holding slot adjacent the respective side of the seat;

FIG. 6 illustrates the device of FIG. 1 when used as a backpack; and,

FIG. 7 is a perspective view of another embodiment, eliminating the foot platform portion.

DESCRIPTION OF THE PREFERRED EMBODIMENTS

Like characters of reference designate like parts in those figures of the drawings in which they occur.

In the drawings:

Referring more particularly to FIGS. 1-6, the reference numeral 10 indicates the device as a whole which is rectangular in general configuration. The device 10 comprises a seat means 12, tree engaging cam means 14 and a foot platform 18.

The device 10 is principally formed from metallic tubing material, square in transverse section in the example shown.

The seat means 12 comprises an endless rectangular normally horizontally disposed seat frame 20, having a central opening 22. A plurality of straps of webbing material 24 are arranged in criss-crossed relation between the forward and rearward end rails 26 and 28 of the seat and between its lateral side rails 30 and 32, respectively.

The cam means 14 comprises a pair of tubular substantially semicircular, in side elevation, cams 34 connected at one end with the rearward rail 28 of the seat and connected at their opposite or depending ends with a transverse frame brace 36 disposed below the seat back rail 28 in downward parallel spaced relation.

Pairs of rearward and forward legs 38 and 40 are respectively connected at their upper limit with the rearward rail 28 and lateral side rails 30 and 32 of the seat.

A step or foot support endless frame 42, elongated rectangular in general configuration is formed by forward and rearward end rails 44 and 46, respectively, and cooperating side rails 48 and 50 interconnected intermediate their ends by a horizontal brace 52.

The depending ends of the rearward legs 38 and forward legs 40 are similarly connected, respectively, at their depending ends with the foot frame rearward rail 46 and the respective side rail 48 and 50.

A pair of cam brace rails 54, only one being shown, FIGS. 2 and 6, extend between the respective rearward and forward leg 38 and 40 and acts as a brace for the cam means 14 when engaging a tree as presently explained.

The forward end of the foot frame 42 is braced with the forward legs 40 at respective sides of the seat and foot frame by a pair of inclined brace members 56.

A foot support platform 58 overlies the forward end portion of the foot support frame 42, forwardly of the foot cross brace 52.

Chain stop means 60 secured to the seat frame at the juncture at its side members 30 and 32 with the back rail 28 receives one link of a tree surrounding chain 62, in the manner hereinafter described.

The chain stop means 60 comprises a planar section of metal flatly secured vertically to the seat frame rail and a transverse stub brace 36' and is provided with a central forward and laterally facing open end slot 64. The width of the slot 64 being complemental with the transverse thickness of the respective link of the chain selected for use in the manner presently explained.

The inner surface of the chain stop 60 is provided with a pair of opposite vertically aligned outstanding lugs 66 on respective sides of the slot which prevents a chain link from being removed or pulled from the lock means slot 64 while the chain is under tension.

The stand or foot frame 42 is further provided with a pair of prongs 70 projecting horizontally rearward from the rearward seat foot frame 46 in vertical and parallel equally spacedapart relation with respect to the cam members 34 and extend rearwardly of the seat frame approximately the same distance as the radius of the semicircular cams 34. The rearward end limit of each of the prongs being sharpened for engaging the bark of a tree as hereinafter explained.

Referring also to FIG. 7, the reference numeral 10' indicates a simplified version of the tree stand, comprising the seat portion 12' similarly formed with respect to the seat frame 12 having identical forward and rearward rails and side members and criss-cross webbing 24'.

In this embodiment, the foot stand frame 42 and its platform 58 are omitted. A pair of stub legs 40' extend downward and rearwardly from the seat frame forward end rail 26' in substantially equally spaced-apart vertically aligned relation with respect to the cam members 34' and terminate in prongs 70' for similarly engaging the bark of a tree as presently explained.

OPERATION

In the embodiment 10 one end of the chain 62 is engaged with one of the slots 64 at one side of the seat frame. The chain is then extended around a tree trunk 75 at a selected elevation and with the forward end portion of the seat of the frame 12 inclined upwardly, the opposite end of the chain is engaged with the opposite side of the seat frame by one of its links entering the slot 64.

The mass of the device 10, when moved downward to a horizontal plane, results in a camming action of the cam means 14 against the surface of the tree 75 so that the cams in accordance with the mass of the device and a hunter, when positioned on the device, forces the cam members 34 partially into the bark of the tree without material damage thereto. This cam action against the tree being arrested by the prongs 70 engaging the tree in downward spaced relation with respect to the cam means.

With a little trial and error, a hunter by considering the thickness of the bark of the tree or the type of tree on which the stand is mounted, soon learns to adjust the tension of the chain 62 when initially entrained around the tree and connected with the seat frame 12 so that the seat frame and stand platform 58 will be substantially horizontally disposed and normal to the vertical axis of the tree 75.

Additionally, a second or auxillary chain 80 is entrained around the tree 75 below the position of the chain 62 and is connected at its respective ends with one end of a turnbuckle 82 connected at its opposite end to the medial portion of the stand or foot support frame cross brace 52, the turnbuckle then being tightened to insure the stand is held rigidly against the tree against vertical pivoting movement away from the tree or lateral movement relative to the tree.

The operation of the other embodiment 10' is substantially identical with respect to being connected with the tree 75 so that its cams 34' similarly engage the tree. The turnbuckle 82' is similarly connected with a second chain, not shown, to secure the seat 10' to the tree.

Both embodiments may be carried or utilized as a backpack. As illustrated by FIG. 6 the stand means 10 stand frame 42 and platform 58 contacts a hunter's back with the seat portion disposed downwardly so that the seat and legs form an open framework enclosure for supporting hunting equipment, not shown.

The stand 10 is supported on the user's back in a conventional manner by a pair of straps 84 connected with respective ends of the foot frame 42 and adjusted for comfort when entrained over the shoulders and under the arms of a hunter.

The seat of the embodiment 10' being similarly attached flatly to a hunter's back by straps 84'. The seat end rail 26' is disposed upwardly and the stub legs form a compartment with the webbing 24' above the cam supporting cross brace 36'.

Obviously the invention is susceptible to changes or alterations without defecting its practicability. Therefore, I do not wish to be confined to the preferred embodiment shown in the drawings and described herein.

I claim:

1. A backpack and tree stand, comprising:
    an endless seat frame having a seat thereon and having a rearward end rail;
    a chain connected at its respective end portions with respective end portions of said rearward seat end rail for transversely surrounding an intermediate portion of an upright support for securing said seat frame to the latter;
    chain stop means including a planar member having outer and inward surfaces and having a forwardly open normally horizontal slot therein secured to opposite sides of said seat frame for receiving a selected intermediate link of said chain and securing respective end portions of said chain against longitudinal movement relative to the seat frame;
    a chain link stop on the inward surface of said planar member adjacent the slot for preventing removal of a chain link from the slot while the chain is under tension;

a transverse horizontal frame member spaced downwardly with respect to said seat frame rearward end rail;

a pair of semicircular cams projecting rearwardly from said seat rearward end rail, each said cam of said pair of cams secured in laterally spaced-apart parallel relation to the central portion of said seat frame rearward end rail and said transverse frame member and having a rearwardly projecting arcuate portion normally disposed downwardly with respect to the normally horizontal plane of the seat for forming a fulcrum and a binding action of said pair of cams against said upright support and supporting said seat in a substantially horizontal plane when said seat is biased downward by the mass of a hunter thereon; and, elongated prong means secured to the seat frame and said transverse frame member and projecting rearwardly and downwardly coextensive with the seat frame and rearward extent of the cam means for contacting said support and stabilizing said seat frame against lateral movement relative to said support.

2. A backpack and tree stand, comprising:

a normally horizontal rectangular seat frame having a woven web seat thereon and having a rearward end rail;

legs depending from said seat frame;

an elongated rectangular foot rest frame supported by said legs in parallel downwardly spaced relation with respect to said seat frame, said foot rest frame projecting at one end portion beyond said seat frame at its end opposite said rearward end rail;

a platform overlying the projecting end portion of said foot rest frame;

a chain connected at its respective end portions with respective end portions of said seat rearward end rail for transversely surrounding an intermediate portion of an upright support for securing said seat frame to the latter;

chain stop means including a planar member having outer and inward surfaces and having a forwardly open normally horizontal slot therein secured to opposite sides of said seat frame for receiving a selected intermediate link of said chain and securing respective end portions of said chain against longitudinal movement relative to the seat frame;

a chain link stop on the inward surface of said planar member adjacent the slot for preventing removal of a chain link from the slot while the chain is under tension;

a transverse horizontal frame brace spaced downwardly with respect to said seat frame rearward end rail and extending between and connected with adjacent frame legs;

a pair of semicircular cams projecting rearwardly from said seat rearward end rail, each said cam of said pair of cams secured in laterally spaced-apart parallel relation to the central portion of said seat frame rearward end rail and said frame brace and having a rearwardly projecting arcuate portion normally disposed downwardly with respect to the normally horizontal plane of the seat for forming a fulcrum and a binding action of said pair of cams against said upright support and supporting said seat in a substantially horizontal plane when said seat is biased downward by the ass of a hunter thereon; and, a pair of prongs secured in horizontal spaced relation to the foot rest frame and projecting rearwardly coextensive with the rearward extent of the cam means for contacting said support and stabilizing said seat frame and said foot rest frame against lateral movement relative to said support.

3. The backpack and tree stand according to claim and further including:

shoulder strap means connected with respective end portions of said foot rest frame for supporting the latter on the back of a user.

* * * * *